United States Patent
Borchsenius et al.

(10) Patent No.: US 8,714,140 B2
(45) Date of Patent: May 6, 2014

(54) METHOD FOR CONTROLLING AN INJECTION VALVE, FUEL INJECTION SYSTEM, AND INTERNAL COMBUSTION ENGINE

(75) Inventors: Fredrik Borchsenius, Donaustauf (DE); Hong Zhang, Tegernheim (DE)

(73) Assignee: Continental Automotive GmbH, Hannover (DE)

( * ) Notice: Subject to any disclaimer, the term of this patent is extended or adjusted under 35 U.S.C. 154(b) by 785 days.

(21) Appl. No.: 12/992,133

(22) PCT Filed: Mar. 23, 2009

(86) PCT No.: PCT/EP2009/053378
§ 371 (c)(1),
(2), (4) Date: Jan. 12, 2011

(87) PCT Pub. No.: WO2009/138282
PCT Pub. Date: Nov. 19, 2009

(65) Prior Publication Data
US 2011/0120423 A1    May 26, 2011

(30) Foreign Application Priority Data
May 13, 2008  (DE) .......................... 10 2008 023 373

(51) Int. Cl.
| | |
|---|---|
| *F02D 41/20* | (2006.01) |
| *F02M 51/00* | (2006.01) |
| *F02D 41/40* | (2006.01) |
| *G06F 19/00* | (2011.01) |

(52) U.S. Cl.
USPC ........................................................ 123/494

(58) Field of Classification Search
USPC ................................ 123/494, 498, 478, 480;
310/316.01–316.03; 361/152–154;
701/101–105, 115
See application file for complete search history.

(56) References Cited

U.S. PATENT DOCUMENTS

| | | | |
|---|---|---|---|
| 6,847,881 B2 | 1/2005 | Melbert | 701/103 |
| 7,040,297 B2 | 5/2006 | Baranowski et al. | 123/498 |

(Continued)

FOREIGN PATENT DOCUMENTS

| | | | | |
|---|---|---|---|---|
| DE | 19930309 A1 | 1/2001 | | F02D 41/38 |
| DE | 10143502 C1 | 3/2003 | | F02D 41/20 |

(Continued)

OTHER PUBLICATIONS

German Office Action, German Patent Application No. 102008023373.0-26, 3 pages, Oct. 15, 2008.

(Continued)

*Primary Examiner* — Hieu T Vo
(74) *Attorney, Agent, or Firm* — King & Spalding L.L.P.

(57) ABSTRACT

A method and system for controlling an injection valve has the following steps: recording a voltage curve of a voltage present at a piezoelectric actuator of the injection valve and a time characteristic curve of an electric charge which is shifted in a circuit with the piezoelectric actuator during a reference injection, computationally determining a force curve of a force applied by the piezoelectric actuator to a moving closing element of the injection valve during the reference injection from the voltage curve and the time characteristic curve of the electric charge, determining a location of a maximum of the force curve,—specifying an activation time instant and/or an activation duration and/or an activation pulse intensity for at least one subsequent injection as a function of a time offset between an activation time instant selected for the reference injection and the maximum of the force curve.

20 Claims, 3 Drawing Sheets

(56) References Cited

U.S. PATENT DOCUMENTS

| | | | |
|---|---|---|---|
| 7,505,846 B2 * | 3/2009 | Stoecklein et al. | 701/105 |
| 2006/0082252 A1 | 4/2006 | Allmendinger et al. | 310/316.03 |

FOREIGN PATENT DOCUMENTS

| | | | | |
|---|---|---|---|---|
| DE | 102004023545 A1 | 12/2005 | | F02D 41/20 |
| EP | 1450028 A2 | 8/2004 | | F02D 41/20 |
| JP | 2005172002 A * | 6/2005 | | F02M 51/06 |
| WO | 03/023212 A1 | 3/2003 | | F02D 41/20 |
| WO | WO 2007082627 A2 * | 7/2007 | | F02D 41/20 |

OTHER PUBLICATIONS

International PCT Search Report and Written Opinion, PCT/EP2009/053378, 13 pages, Jul. 27, 2009.

* cited by examiner

METHOD FOR CONTROLLING AN INJECTION VALVE, FUEL INJECTION SYSTEM, AND INTERNAL COMBUSTION ENGINE

CROSS-REFERENCE TO RELATED APPLICATIONS

This application is a U.S. National Stage Application of International Application No. PCT/EP2009/053378 filed Mar. 23, 2009, which designates the United States of America, and claims priority to German Application No. 10 2008 023 373.0 filed May 13, 2008, the contents of which are hereby incorporated by reference in their entirety.

TECHNICAL FIELD

The invention relates to a method for controlling a piezoelectrically actuated injection valve of a fuel injection system for an internal combustion engine as well as to a corresponding fuel injection system and an internal combustion engine incorporating such a fuel injection system.

BACKGROUND

In order to open a piezoelectrically actuated injection valve for a fuel injection, an electrical control signal is applied to a piezoelectric actuator of the injection valve, whereupon the piezoelectric actuator opens a closing element of the injection valve that is typically embodied as a valve needle. Owing to very fast response characteristics of piezoelectric actuators of said type even very small injection quantities can be metered relatively accurately by means of such injection valves and if necessary a plurality of single injections can be performed in succession in a short time span. However, a manufacturing-related or wear-induced idle stroke between the piezoelectric actuator and the closing element is inevitable and the precise value thereof is generally unknown. Such an idle stroke, which comes about due to play between the piezoelectric actuator and the closing element, leads to a situation where the injection valve does not open following its actuation until after a delay whose length is not precisely known. This in turn leads to a disadvantageous lack of precision in terms of an injection time instant, which shall be defined here as the beginning of a single injection, and also, as a consequence thereof, to a discrepancy between an actually injected fuel quantity and a target injection quantity.

SUMMARY

According to various embodiments, a method for controlling a piezoelectrically actuated injection valve of a fuel injection system for an internal combustion engine can be provided which permits an actual injection time instant to be set more precisely and consequently also allows a more precise metering of an injection quantity. According to further embodiments, a corresponding fuel injection system can be provided which permits injection time instants and injection quantities to be controlled comparatively precisely, as well as an internal combustion engine having such a fuel injection system.

According to an embodiment, a method for controlling a piezoelectrically actuated injection valve of a fuel injection system for an internal combustion engine, may comprise:— recording a voltage curve of a voltage present at a piezoelectric actuator of the injection valve and a time characteristic curve of an electric charge which is shifted in a circuit comprising the piezoelectric actuator during a reference injection performed by the injection valve,—computationally determining a force curve of a force applied by the piezoelectric actuator to a moving closing element of the injection valve during the reference injection from the voltage curve and the time characteristic curve of the electric charge,—determining a location of a maximum of the force curve, and—specifying an activation time instant and/or an activation duration and/or an activation pulse intensity for at least one subsequent injection as a function of a time offset between an activation time instant selected for the reference injection and the maximum of the force curve.

According to a further embodiment, for the purpose of recording its time characteristic curve the electric charge can be determined by measuring a current profile of a current flowing through the cited circuit and computationally integrated over a time that is likewise recorded. According to a further embodiment, in order to determine the force curve the force applied by the piezoelectric actuator can be determined by means of a linear piezoelectric force model as a function of the voltage and the electric charge. According to a further embodiment, the activation time instant can be set as a correcting variable of a closed-loop control circuit in such a way that the location of the maximum of the force curve is adjusted to a setpoint value. According to a further embodiment, the activation time instant for the at least one subsequent injection can be moved forward ahead of a nominal activation time instant by a time value which corresponds to a difference between the actual time offset and a nominal value for the time offset between activation time instant and maximum of the force curve. According to a further embodiment, the activation duration for the at least one subsequent injection can be selected to be greater relative to a nominal activation duration by a time value which corresponds to a difference, multiplied by a factor of between 1 and 2, between the actual time offset and a nominal value for the time offset between activation time instant and maximum of the force curve. According to a further embodiment, a fuel pressure in a fuel line supplying the injection valve during the at least one subsequent injection for which the activation time instant and/or the activation duration and/or the activation pulse intensity are/is corrected may have the same value as during the reference injection. According to a further embodiment, the method may be performed continuously or repeatedly at defined intervals for each injection valve of the fuel injection system during operation of the corresponding internal combustion engine.

According to another embodiment, a fuel injection system for an internal combustion engine, may comprise for each cylinder of the internal combustion engine in each case an injection valve that is to be actuated by means of a piezoelectric actuator and a control device for activating the injection valves, the control device being configured by programming means for controlling the injection valves with the aid of a method as described above.

According to a further embodiment of the fuel injection system, the system can be embodied as a common-rail injection system. According to a further embodiment of the fuel injection system, as closing elements the injection valves in each case may have a valve needle that is movable by means of the piezoelectric actuator. According to a further embodiment of the fuel injection system, the system may have at least a voltmeter for recording the voltage curve and an ammeter for measuring the current profile, wherein the control device comprises an integration unit for determining the electric charge as a function of the measured current profile.

According to yet another embodiment, an internal combustion engine may comprise a fuel injection system as described above.

BRIEF DESCRIPTION OF THE DRAWINGS

Exemplary embodiments are explained below with reference to FIGS. 1 to 3, in which.

DETAILED DESCRIPTION

In the case of the proposed method for controlling a piezoelectrically actuated injection valve of a fuel injection system for an internal combustion engine, a voltage curve of a voltage present at a piezoelectric actuator of the injection valve and a time characteristic curve of an electric charge that is shifted in a circuit comprising the piezoelectric actuator are first recorded during at least one reference injection performed by the injection valve. In this case the reference injection does not have to be a specifically characterized injection operation; rather, any regular injection during operation of the corresponding internal combustion engine may serve as a reference injection, which is only designated as such in this context because it is used for correcting an activation of the injection valve in at least one subsequent injection.

A force curve of a force applied to a moving closing element of the injection valve by the piezoelectric actuator during the reference injection is then determined computationally from the thus recorded voltage curve and the time characteristic curve of the electric charge. This can be accomplished in a simple manner and with adequate precision using a linear piezoelectric force model which specifies the force exerted by the piezoelectric actuator as a function of the voltage and the electric charge.

Finally, a location of a maximum of the said force curve is determined and an activation time instant and/or an activation duration and/or an activation pulse intensity for at least one subsequent injection are/is specified as a function of a time offset between an activation time instant selected for the reference injection and the maximum of the force curve. In this case the location of the maximum and the activation time instant or the activation duration and the said time offset can be defined in particular by way of a crankshaft angle or a variable reflecting the crankshaft angle. The time offset, as a function of which the activation time instant and/or the activation duration and/or the activation pulse intensity for the at least one subsequent injection are/is specified, does not necessarily have to be determined explicitly; rather, a time instant—defined for example by a crankshaft angle—can also be determined instead, which time instant relates one-to-one with said time offset, e.g. the time instant of the maximum of the force curve itself. The time instant of a beginning of a control signal for opening the injection valve or time instant at which an action triggering said control signal takes place can be designated as the activation time instant, for example.

The proposed method is based on the insight that on the one hand the force exerted by the piezoelectric actuator is dependent in a very simple and unequivocal way on the voltage present at the piezoelectric actuator and the charge shifted by the piezoelectric actuator and that on the other hand the location of the maximum of the force curve is closely correlated with a time instant at which the closing element actually opens and the injection valve releases a path for a fuel injection. The latter is due to the fact that a fuel pressure prevailing in the injection valve at the moment of its opening drops abruptly due to the fuel that then streams out. Determining the location of the maximum of the force curve of the force applied by the piezoelectric actuator therefore permits the time instant of the actual opening of the injection valve to be deduced, which time instant is initially known only within certain limits, i.e. approximately, on account of a not precisely known idle stroke or play of the injection valve.

The method described permits a correction of an activation of the injection valve with which deviations of the said play from an average value can be taken into account and consequently much more precisely metered and more accurately timed injections can be implemented.

A correspondingly advantageous fuel injection system for an internal combustion engine by means of which, within the present meaning, a very precise control of injections is possible comprises in each case for each cylinder of the internal combustion engine at least one injection valve that is to be actuated by means of a piezoelectric actuator as well as a control device for activating the injection valves, the control device being configured by programming means for controlling the injection valves with the aid of a method of the type described. Typically, said fuel injection system will be embodied as a common-rail injection system, the said control device possibly being integrated e.g. into an ECU (Engine Control Unit) of an internal combustion engine equipped with such a fuel injection system. In typical embodiments the closing elements that are movable by means of the piezoelectric actuator of the respective injection valve are implemented as valve needles, the piezoelectric actuator possibly having a plurality of ring-shaped piezoelectric elements which can enclose the valve needle or an extension of the valve needle.

In order to record the time characteristic curve of the electric charge that is shifted in the circuit comprising the piezoelectric actuator of the respective injection valve, a current profile of a current flowing through said circuit can be measured and computationally integrated via a time that is recorded directly or indirectly, e.g. via a crankshaft angle. The fuel injection system that is suitable for performing the described method can accordingly have at least one voltmeter for recording the voltage curve as well as an ammeter for measuring the current profile, the control device of the fuel injection system then preferably comprising an integration unit for determining the electric charge as a function of the measured current profile.

The proposed method can easily be realized by programming means in that the activation time instant is set with the aid of a closed-loop control circuit as a correcting variable in such a way that the location of the maximum of the force curve, which can then be considered a control variable, is adjusted to a setpoint value which again can be defined e.g. via a crankshaft angle or a specific value of a variable reflecting a crankshaft angle and generally will be dependent on a current operating state of the corresponding internal combustion engine. In this case a difference between the actual location of the maximum and the setpoint value can serve as an error variable.

In order to compensate for a delayed actual start of injection caused by a play of the injection valve, the activation time instant can be shifted by means of the described method for the at least one subsequent injection by a time value prior to a nominal activation time instant which corresponds to a difference between the actual time offset and a nominal value for the time offset between activation time instant and maximum of the force curve. If this difference is negative, in other words if the actual time offset is less than the corresponding nominal value, the activation time instant for the at least one subsequent injection can be shifted accordingly by the amount of the difference after the nominal activation time instant. This can happen by means of a closed-loop control circuit of the above-described type or alternatively by means of a readout of a nominal value for the time offset stored therefor and a redefinition of the activation time instant differing from the nominal activation time instant as a function of the then determined difference between the actual time offset and the nominal value.

Since an increased play between piezoelectric actuator and closing element is accompanied not only by a later actual start of injection, but consequently also by a shorter actual injection duration, the method can advantageously be designed such that not only is the activation time instant shifted, but the activation duration for the at least one subsequent injection is corrected also. In this way it can be ensured that the actually injected fuel quantity corresponds to the target injection quantity. Toward that end the activation duration for the at least one subsequent injection can be extended compared to a nominal activation duration by a time value that corresponds to a difference, multiplied by a factor of between 1 and 2, between the actual time offset and a nominal value for the time offset between activation time instant and maximum of the force curve. Accordingly, the activation duration can be shortened by the amount of the difference if the difference is negative, in other words if the actual time offset is less than the nominal value for the time offset. A change corresponding to the difference between the actual time offset and the nominal value for the time offset in the activation duration compared to the nominal activation duration can be easily realized by shifting the activation time instant in one of the above-described ways, while an end of the corresponding control pulse is left unchanged. In many application cases this will already result in a satisfactory correction of the activation of the injection valve. Under certain conditions, however, an increased play between piezoelectric actuator and closing element of the injection valve can lead not only to a delayed opening of the injection valve, but also to a premature closing of the injection valve. In many instances even better results can therefore be achieved if—in the case of a positive difference between actual time offset and nominal value—as well as bringing forward the activation time instant the corresponding control pulse is lengthened such that in addition the end of the control pulse is deferred. However, extending the activation duration compared to the nominal activation duration by more than twice the difference between the actual time offset and the nominal value for the time offset between activation time instant and maximum of the force curve will generally not be necessary in order to achieve a satisfactory compensation of an increased idle stroke.

Alternatively or in addition, both the actual start of injection defined by the opening of the injection valve and the injection duration can also be corrected by specifying the activation pulse intensity, in other words an intensity of the control pulse, as a function of the idle stroke of the injection valve which is reflected in the cited time offset. A measure for the activation pulse intensity is, for example, a charge energy dependent on the shifted charge, via which charge energy a stroke executed by the piezoelectric actuator can in turn be corrected. Thus, in the case of a greater idle stroke which is detected via a delayed maximum of the force curve, a greater and/or faster stroke of the piezoelectric actuator can be achieved by increasing the charge energy introduced into the piezoelectric actuator, which in turn results in an earlier opening time instant. In this way also the opening time instant of the injection valve can be adjusted to a setpoint value for the opening time instant or, as the case may be, the start of injection.

Since a precise value of a small time gap between an actual start of injection and the maximum of the force curve can also depend on a fuel pressure which prevails in a fuel line supplying the injection valve and which is typically referred to as the rail pressure, it can be advantageous with regard to a maximally precise correction of the control of the injection valve if, during the at least one subsequent injection for which the activation time instant and/or the activation duration and/or the activation pulse intensity are/is corrected, said fuel pressure has the same value as during the reference injection. That will be the case with a sufficiently high degree of precision if an injection for which the activation time instant and/or the activation duration and/or the activation pulse intensity are/is corrected falls into a working cycle immediately following a working cycle in which the reference injection took place.

The described method for controlling the piezoelectrically actuated injection valve, which in particular is a method for correcting an activation of the injection valve, can advantageously be performed for each injection valve of the fuel injection system, for example continuously or repeatedly at defined intervals during operation of the corresponding internal combustion engine. A continuous performance of the method can be realized in particular by treating the activation time instant in a manner described hereintofore as a correcting variable of a closed-loop control circuit.

Figure 1:
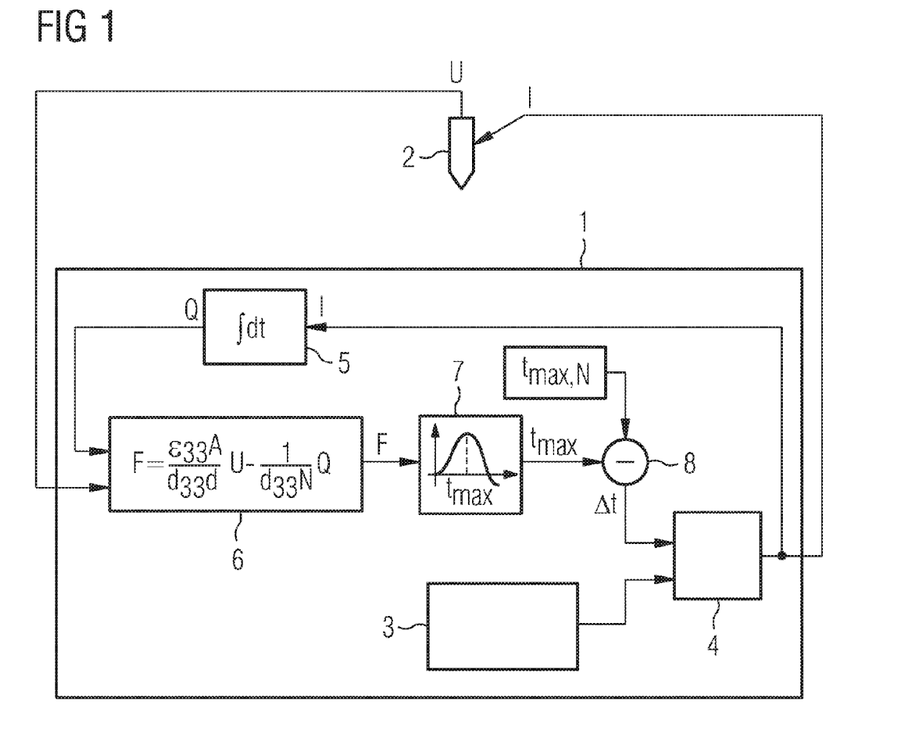
FIG. 1 shows a schematic representation of a part of a fuel injection system in which a closed-loop control circuit for controlling an injection valve is also depicted.

FIG. 1 shows several components of a fuel injection system of an internal combustion engine embodied as a common-rail injection system. Said injection system comprises a control device 1 which is part of an ECU of the internal combustion engine, as well as one piezoelectrically actuated injection valve 2 for each cylinder of the internal combustion engine, only one of which is shown in FIG. 1, the remaining valves being activated in a corresponding manner by the control device 1. As a closing element, each of the injection valves 2 has a valve needle (not shown in FIG. 1) and a piezoelectric actuator for moving the valve needle. The piezoelectric actuator comprises a stack of N piezoelectric elements, each of which has an active surface A and a layer thickness d and is characterized by a dielectric constant $\in_{33}$ and an electromechanical coupling factor $d_{33}$. Other components of the corresponding internal combustion engine which are not relevant at the present time are not shown in FIG. 1.

The control device 1 comprises a conventional injector controller 3 for the injection valve 2, which is also referred to as an injector, which injector controller 3 generates a control signal for the injection valve 2 as a function of a current operating state of the internal combustion engine, said control signal initiating an opening of the injection valve 2 when a fuel injection into the cylinder assigned to the injection valve 2 is to be performed. Said control signal is finally applied to the piezoelectric actuator of the injection valve 2 in the form of a voltage pulse, whereupon said actuator distorts and effects a lifting of the valve needle, which in turn results in an opening of a nozzle orifice of the injection valve 2. The control signal for a single injection brought into a final form in a signal forming unit 4 (also shown) as a function of an output of the injector controller 3 is characterized in particular by an activation time instant which shall be defined as the beginning of the voltage pulse, as well as by an activation duration by means of which a length of the voltage pulse shall be designated. In this case the signal causes a time-dependent voltage U to be applied to the piezoelectric actuator of the injection valve 2 and a time-dependent current I to flow through a circuit comprising the piezoelectric actuator. In order to record a voltage curve of the voltage U and a current profile of the current I flowing through the cited circuit, the voltage U is measured by means of a voltmeter that is not shown explicitly and the current I is measured by means of a ammeter that is likewise not shown explicitly. In addition the control device 1 of the injection system has an integration unit 5 by means of which an electric charge Q shifted in the cited circuit is determined in that the current profile of the current I is integrated over an additionally recorded time. Thus, not only the voltage curve, but also a time characteristic curve of the charge Q during each injection performed by the injection valve 2 are recorded.

The control device 1 is therein embodied in such a way that each of these injections is used in each case as a reference injection for correcting a subsequent control signal for a corresponding injection in a following working cycle of the internal combustion engine. For that purpose a force curve of a force F applied by the piezoelectric actuator to the valve needle of the injection valve 2 is first determined during the injection operation serving as a reference injection for the corresponding subsequent injection. This is accomplished computationally by means of a linear piezoelectric force model 6 using the additionally recorded voltage curve and the time characteristic curve of the electric charge Q obtained by means of the integration unit 5. In this case the force F is calculated as a function of already defined variables and parameters as $$F = \frac{\varepsilon_{33} A}{d_{33} d} U - \frac{1}{d_{33} N} Q.$$

By means of a maximum detection element 7 likewise illustrated in FIG. 1 a location $t_{max}$ of a maximum of the force curve is then determined which in the present exemplary embodiment shall be defined in relation to a nominal activation time instant output by the injector controller 3. A difference $\Delta t$ between the thus determined location $t_{max}$ of the maximum and a nominal value $t_{max,N}$ is then formed by means of a subtraction element 8. In this case the nominal value $t_{max,N}$ defines a setpoint value for the location $t_{max}$ of the maximum, in the present case once again in relation to the nominal activation time instant output by the injector controller 3, and owing to the chosen definition of the zero point can be considered as a nominal value $t_{max,N}$ for a time offset between activation time instant and maximum of the force curve.

In the signal forming unit 4, the control signal for the injection following the respective reference injection can be changed such that the activation time instant is shifted relative to the activation time instant for the reference injection by the difference $\Delta t$, and specifically is brought forward if the value of the location $t_{max}$ of the maximum is greater than the nominal value $t_{max,N}$, and is shifted to a later time instant if the determined value of the location $t_{max}$ of the maximum during the reference injection is less than the nominal value $t_{max,N}$. In this way a closed-loop control circuit is realized by means of which the activation time instant is set as a correcting variable in such a way that the location $t_{max}$ of the maximum of the force curve is adjusted to a setpoint value, in the present example to the nominal value $t_{max,N}$. In this case the nominal value $t_{max,N}$ can be defined like the output of the injector controller 3 as a function of an operating state of the internal combustion engine. Furthermore, the location $t_{max}$, the nominal value $t_{max,N}$ and the activation time instant can be defined, like the activation duration also, via a crankshaft angle or a variable reflecting the crankshaft angle, since at a given rotational speed said variable forms a unique measure for the physical time.

The control device 1 is configured by programming means for performing the described method steps, with in particular the signal forming unit 4, the integration unit 5, the linear piezoelectric force model 6, the maximum detection element 7 and the subtraction element 8 being realized by programming means.

What is achieved in the manner described is that the activation time instant for the subsequent injections is displaced relative to the respective reference injection by a time value prior to a nominal activation time instant output by the injector controller 3 which corresponds to a difference of the actual time offset between an activation time instant selected for the reference injection and the maximum of the force curve from the nominal value $t_{max,N}$ for the time offset between activation time instant and maximum of the force curve. Instead of by means of the closed-loop control circuit described here, in an alternative embodiment of a corresponding injection system this can also be accomplished in that the actual time offset between the activation time instant selected for the reference injection and the maximum of the force curve is determined and for the purpose of forming the difference between said actual time offset and the nominal value $t_{max,N}$ is compared with the nominal value $t_{max,N}$ additionally stored as an operating-state-dependent variable, after which the activation time instant for the following injections is specified such that it lies by the amount of said difference prior to or, in the case of a negative difference, after the nominal activation time instant likewise specified as a function of the operating state.

The exemplary embodiment from FIG. 1 provides that by means of a change of the activation time instant the activation duration for the subsequent injection in each case is also changed, namely in that only the activation time instant in the sense of the beginning of the control signal output by the signal forming unit 4 is changed in the signal forming unit 4, but not its end. What is achieved thereby is that the activation for the subsequent injections is shifted relative to a predefined nominal activation duration by a time value that corresponds to the difference between the actual time offset recorded for the reference injection and the nominal value for the time offset between activation point and maximum of the force curve, the activation duration being extended if the difference is positive and shortened if the difference is negative. In order to take into account that an idle stroke between piezoelectric actuator and valve needle in the injection valve 2 can lead not only to a delayed opening of the injection valve 2, but also to a premature closing of the injection valve 2, it can also be provided in an alternative embodiment of the injection system that the end of the control pulse is shifted back relative to the reference injection e.g. by the amount by which the injection time instant is brought forward in the sense of the beginning of the control signal or vice versa.

In a further variation of the method described with reference to FIG. 1, the actual start of injection defined by the opening of the injection valve and the injection duration are corrected in that an activation pulse intensity, which is to say an intensity of the control pulse applied to the piezoelectric actuator, is specified in the signal forming unit 4 as a function of the idle stroke of the injection valve 2 or, as the case may be, of the difference $\Delta t$. In this case a measure for the activation pulse intensity is a charge energy which is dependent on the shifted charge Q and on which in turn the size of a piezoelectric stroke executed by the piezoelectric actuator depends. In the case of a greater idle stroke, which is detected via a delayed location $t_{max}$ of the maximum of the force curve, a greater and faster stroke of the piezoelectric actuator is then effected by increasing the charge energy introduced into the piezoelectric actuator, which in turn results both in an earlier opening time instant and in a longer injection duration. In this way both the opening time instant and the injection duration can be readjusted to corresponding setpoint values.

Since in the described exemplary embodiments the injection for which the activation time instant and the activation duration or, as the case may be, the activation pulse intensity is changed compared to the activation time instant and the activation duration for the corresponding reference injection falls into a working cycle immediately following the working cycle of the reference injection, it is ensured that a rail pressure prevailing in a fuel line supplying the injection valves 2 has the same value during the subsequent injection as during the corresponding reference injection. In this case the injection system outlined in FIG. 1 is configured in such a way that a correction of the activation time instants and activation durations is performed continuously during operation of the internal combustion engine for all injection valves 2 of said internal combustion engine. In an alternative embodiment of such an injection system it can also be provided that a correction of said kind is performed only at defined intervals during operation of the internal combustion engine.

Figure 2:
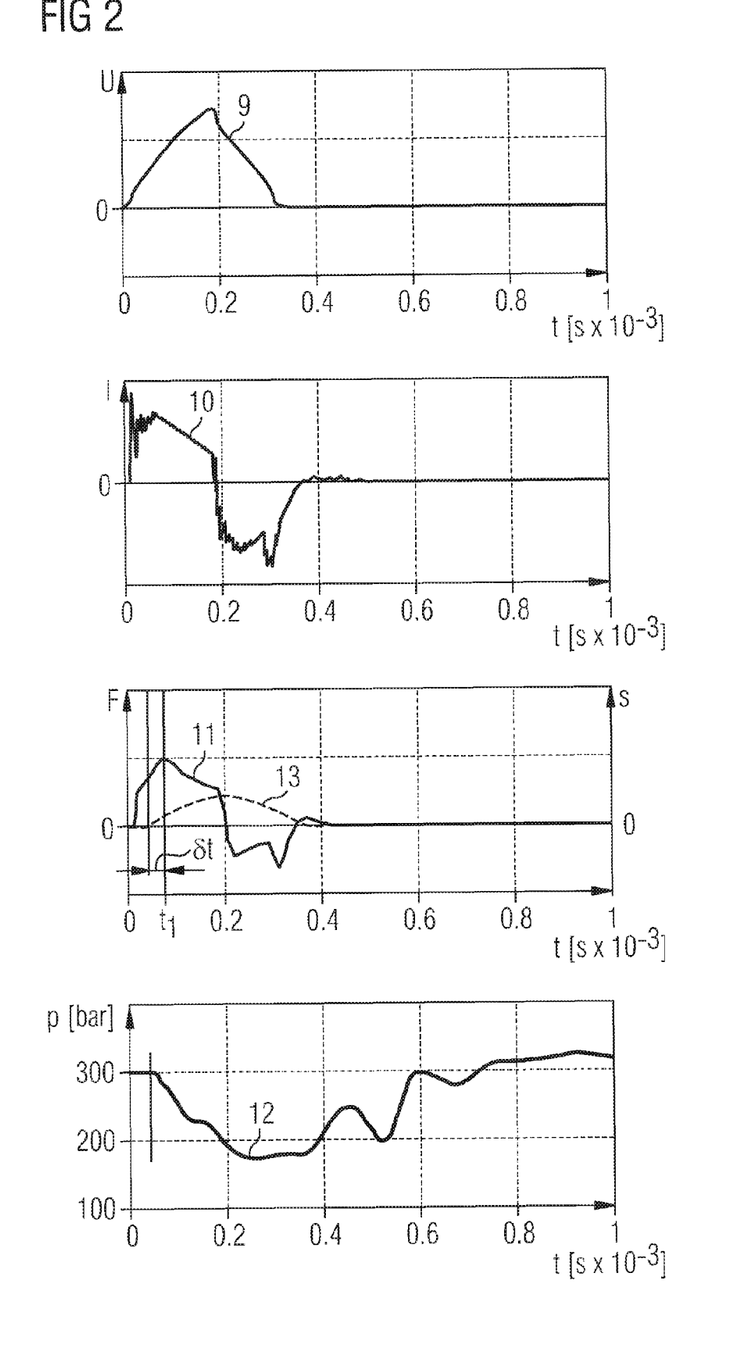
FIG. 2 shows four diagrams with characteristic curves of variables relevant to an injection operation during an injection.
Figure 3:
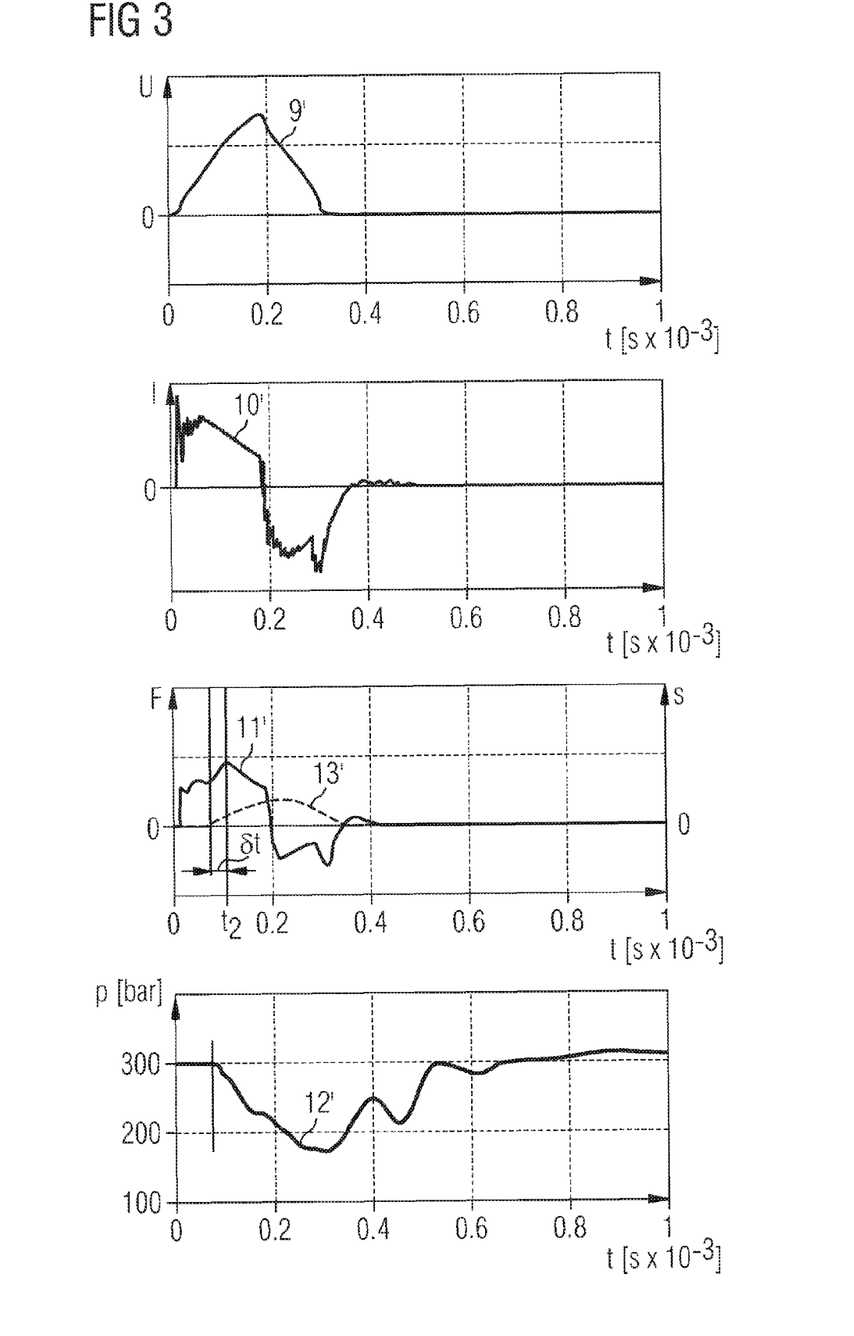
FIG. 3 shows, in a representation corresponding to FIG. 2, four diagrams with corresponding characteristic curves for an injection valve having an increased idle stroke.

In order to illustrate the operations on which the described method is based, FIGS. 2 and 3 show time characteristic curves of different physical variables during a single injection for two injectors which are different from each other in terms of different idle strokes between the respective piezoelectric actuator and the respective valve needle.

The ordinate of the diagrams serves in each case as a time axis, the zero point of said time axes being chosen as the nominal activation time instant for the respective injector, which is to say as the time instant that is provided as the beginning for an as yet uncorrected control signal for said injector. In this case the cited injector corresponds to the injection valve 2 from FIG. 1.

In FIG. 2, which relates to an injector having a very small idle stroke of 2 μm, the topmost graph shows a voltage curve 9 of the voltage U applied to the piezoelectric actuator of the injector during the injection which forms the control signal for the piezoelectric actuator or, as the case may be, the injector. The graph below it shows a current profile 10 of the current I flowing through the piezoelectric actuator at the same time. The following diagram shows a force curve 11 of the force F applied by the piezoelectric actuator to the valve needle of the injector, said force being computationally determined in the case of the injection system from FIG. 1 in that firstly the time characteristic curve of the charge Q shifted by the current I is determined by means of the integration unit 5 from the current profile 10 and the force F is deduced from said charge Q and the likewise measured voltage U by means of the linear piezoelectric force model 6.

It can clearly be seen that following activation of the injector the force curve 11 assumes a maximum, and moreover in this case at a first value $t_1$ on the time axis. The cause of this maximum can be found in an opening of the injector due to a lifting of the valve needle, because said opening leads to an abrupt drop in a fuel pressure p prevailing in the injector. A curve 12 of said fuel pressure p is shown in the final diagram of FIG. 2. A comparison of the last two diagrams shows that the maximum of the force curve follows the opening of the injector, offset by a very small time difference Δt which occurs simultaneously with a beginning of the pressure drop identified by a vertical line in the last two diagrams of FIG. 2. In order to illustrate same a time characteristic curve 13 of a stroke s of the valve needle is also plotted in the next-to-last diagram of FIG. 2.

FIG. 3 shows, in a representation corresponding to FIG. 2, a voltage curve 9', a current profile 10', a force curve 11', a curve 12' of the fuel pressure in the injector, and a curve 13' of the stroke s of the valve needle of an injector which, compared to the injector to which FIG. 2 relates, differs only in terms of an increased idle stroke between piezoelectric actuator and valve needle of 10 μm. Because of the greater idle stroke the valve needle in this case lifts somewhat later, for which reason the drop in pressure, correlated with the opening, of the pressure p prevailing in the injector, or more precisely in a control chamber of the injector, also occurs later. For the same reason the maximum of the force curve 11' also occurs later than in the case of the force curve 11 from FIG. 2, namely at a second value $t_2$ on the time axis. Conversely, the time difference Δt between the maximum of the force curve 11' and the moment at which the valve needle starts to lift has a value corresponding to the time difference Δt from FIG. 2. It is therefore possible to deduce from the location of the maximum of the force curve 11' the actual injection time instant or, as the case may be, a deviation of said injection time instant from a setpoint injection time instant. In order to align the actual injection time instant for subsequent injections with the setpoint injection time instant and achieve a correct metering of an injection quantity, the activation time instant that corresponds to the beginning of the control signal that can be seen in the top diagram of FIGS. 2 and 3 in each case, or alternatively the activation pulse intensity, is therefore changed for subsequent injections in accordance with the method described hereintofore with reference to FIG. 1.

What is claimed is:

1. A fuel injection system for an internal combustion engine, comprising for each cylinder of the internal combustion engine in each case an injection valve that is to be actuated by means of a piezoelectric actuator and a control device for activating the injection valves, the control device being configured by programming means for controlling the injection valves:
    to record a voltage curve of a voltage present at a piezoelectric actuator of the injection valve and a time characteristic curve of an electric charge which is shifted in a circuit comprising the piezoelectric actuator during a reference injection performed by the injection valve,
    to computationally determine a force curve of a force applied by the piezoelectric actuator to a moving closing element of the injection valve during the reference injection from the voltage curve and the time characteristic curve of the electric charge,
    to determine a location of a maximum of the force curve,
    to specify at least one of an activation time instant, an activation duration, and an activation pulse intensity for at least one subsequent injection as a function of a time offset between an activation time instant selected for the reference injection and the maximum of the force curve.

2. The fuel injection system according to claim 1, wherein the system is embodied as a common-rail injection system.

3. The fuel injection system according to claim 1, wherein as closing elements the injection valves in each case have a valve needle that is movable by means of the piezoelectric actuator.

4. The fuel injection system according to claim 1, wherein the system has at least a voltmeter for recording the voltage curve and an ammeter for measuring the current profile, wherein the control device comprises an integration unit for determining the electric charge as a function of the measured current profile.

5. An internal combustion engine, comprising a fuel injection system according to claim 1, wherein.

6. The fuel injection system according to claim 1, wherein for the purpose of recording its time characteristic curve the system is operable to determine the electric charge by measuring a current profile of a current flowing through the circuit and computationally integrated over a time that is likewise recorded.

7. The fuel injection system according to claim 1, further comprising a linear piezoelectric force model to determine the force curve the force applied by the piezoelectric actuator as a function of the voltage and the electric charge.

8. The fuel injection system according to claim 1, wherein the system is further operable to set the activation time instant as a correcting variable of a closed-loop control circuit in such a way that the location of the maximum of the force curve is adjusted to a setpoint value.

9. The fuel injection system according to claim 1, wherein the system is further operable to move the activation time instant for the at least one subsequent injection forward ahead of a nominal activation time instant by a time value which corresponds to a difference between the actual time offset and a nominal value for the time offset between activation time instant and maximum of the force curve.

10. The fuel injection system according to claim 1, wherein the system is further operable to select the activation duration for the at least one subsequent injection to be greater relative to a nominal activation duration by a time value which corresponds to a difference, multiplied by a factor of between 1 and 2, between the actual time offset and a nominal value for the time offset between activation time instant and maximum of the force curve.

11. The fuel injection system according to claim 1, wherein a fuel pressure in a fuel line supplying the injection valve during the at least one subsequent injection for which at least one of the activation time instant, the activation duration, and the activation pulse intensity are/is corrected has the same value as during the reference injection.

12. The fuel injection system according to claim 1, wherein the controlling of the injection valves is performed continuously or repeatedly at defined intervals for each injection valve of the fuel injection system during operation of the corresponding internal combustion engine.

13. A method for controlling a piezoelectrically actuated injection valve of a fuel injection system for an internal combustion engine, said method comprising:
    recording a voltage curve of a voltage present at a piezoelectric actuator of the injection valve and a time characteristic curve of an electric charge which is shifted in a circuit comprising the piezoelectric actuator during a reference injection performed by the injection valve,
    computationally determining a force curve of a force applied by the piezoelectric actuator to a moving closing element of the injection valve during the reference injection from the voltage curve and the time characteristic curve of the electric charge,
    determining a location of a maximum of the force curve,
    specifying at least one of an activation time instant, an activation duration, and an activation pulse intensity for at least one subsequent injection as a function of a time offset between an activation time instant selected for the reference injection and the maximum of the force curve.

14. The method according to claim 13, wherein for the purpose of recording its time characteristic curve the electric charge is determined by measuring a current profile of a current flowing through the circuit and computationally integrated over a time that is likewise recorded.

15. The method according to claim 13, wherein in order to determine the force curve the force applied by the piezoelectric actuator is determined by means of a linear piezoelectric force model as a function of the voltage and the electric charge.

16. The method according to claim 13, wherein the activation time instant is set as a correcting variable of a closed-loop control circuit in such a way that the location of the maximum of the force curve is adjusted to a setpoint value.

17. The method according to claim 13, wherein the activation time instant for the at least one subsequent injection is moved forward ahead of a nominal activation time instant by a time value which corresponds to a difference between the actual time offset and a nominal value for the time offset between activation time instant and maximum of the force curve.

18. The method according to claim 13, wherein the activation duration for the at least one subsequent injection is selected to be greater relative to a nominal activation duration by a time value which corresponds to a difference, multiplied by a factor of between 1 and 2, between the actual time offset and a nominal value for the time offset between activation time instant and maximum of the force curve.

19. The method according to claim 13, wherein a fuel pressure in a fuel line supplying the injection valve during the at least one subsequent injection for which at least one of the activation time instant, the activation duration, and the activation pulse intensity are/is corrected has the same value as during the reference injection.

20. The method according to claim 13, wherein the method is performed continuously or repeatedly at defined intervals for each injection valve of the fuel injection system during operation of the corresponding internal combustion engine.

* * * * *